P. STONER.
POSITIONING MEANS FOR GRINDING WHEEL CARRIAGES.
APPLICATION FILED NOV. 18, 1920.
1,416,994.
Patented May 23, 1922.
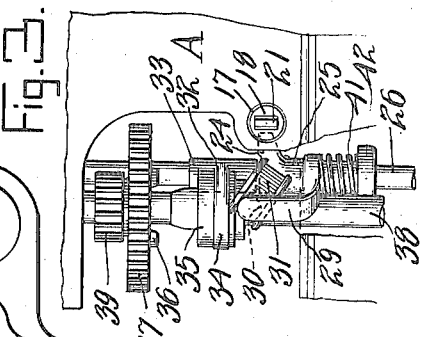
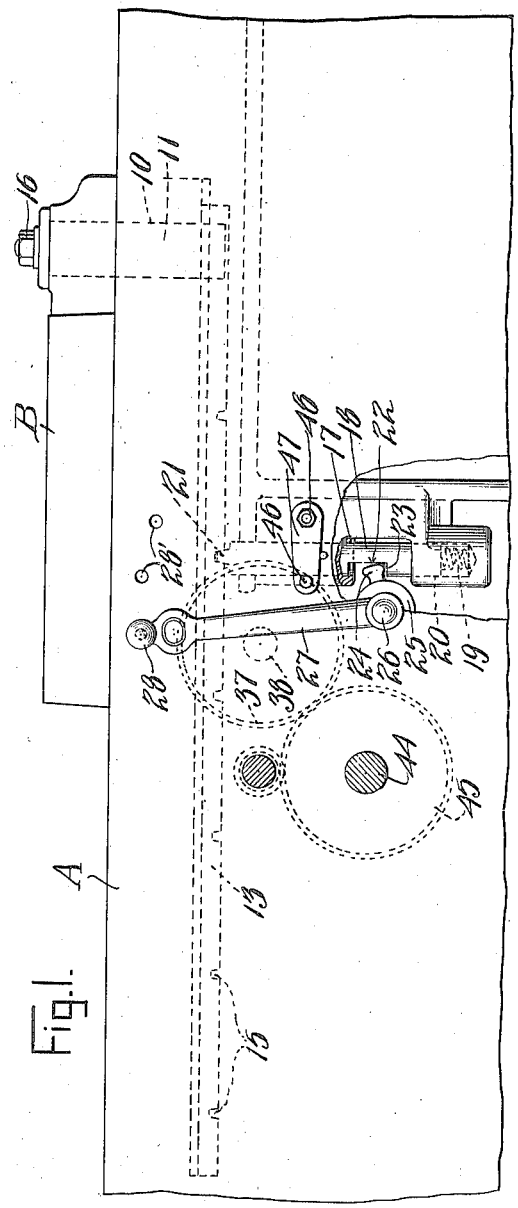
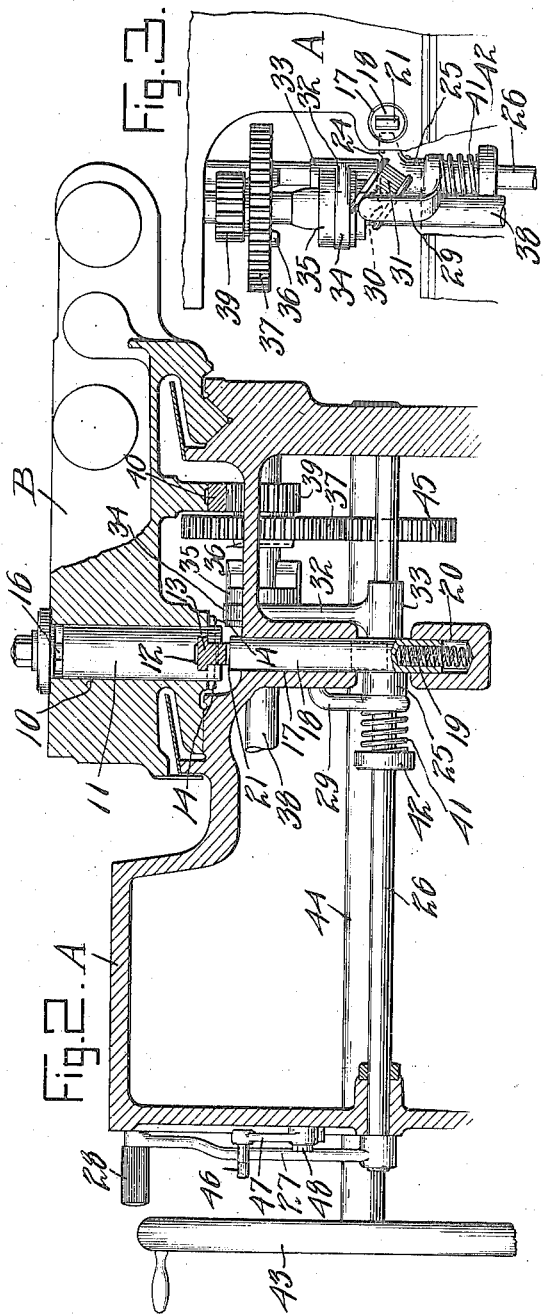
Inventor
Paul Stoner
By
Attorneys

UNITED STATES PATENT OFFICE.

PAUL STONER, OF WAYNESBORO, PENNSYLVANIA, ASSIGNOR TO LANDIS TOOL COMPANY, OF WAYNESBORO, PENNSYLVANIA, A CORPORATION OF PENNSYLVANIA.

POSITIONING MEANS FOR GRINDING-WHEEL CARRIAGES.

1,416,994.　　　　　　　Specification of Letters Patent.　　Patented May 23, 1922.

Application filed November 18, 1920. Serial No. 424,904.

*To all whom it may concern:*

Be it known that I, PAUL STONER, a citizen of the United States, residing at Waynesboro, in the county of Franklin and State of Pennsylvania, have invented certain new and useful Improvements in Positioning Means for Grinding - Wheel Carriages, of which the following is a specification.

My said invention relates to positioning means for grinding wheel carriages and is designed primarily to be used in connection with a machine for grinding the crank pins of crank shafts, or any work requiring grinding at a series of predetermined points and its main object is to provide the reciprocatory wheel carriage of a grinding machine with means to lock the carriage in predetermined positions corresponding to the parts of the work that require grinding. For example, if it is necessary to grind the crankpins of several similar crank-shafts, locking means for the carriage will be provided at points spaced according to the distance between the longitudinal centers of the corresponding crankpins to be ground, so that after one pin has been finished the wheel carriage can be moved to place the wheel in the exact position to grind the next succeeding pin.

Another object is to provide means for adjusting the notched bar with relation to the wheel carriage.

Still another object is to provide a safety device which will prevent the operator from connecting the reciprocating drive accidentally.

Referring to the accompanying drawings which are made a part hereof and on which similar reference characters indicate similar parts, Figure 1 is a fragmentary side elevation of the device;

Figure 2, a vertical cross section thereof; and

Figure 3, a fragmentary plan view of a portion thereof.

The character A represents the base of a cylindrical grinding machine upon which is mounted a wheel carriage B, adapted to reciprocate or to be held stationary by the device to be described.

Mounted in a vertical bore 10 in the carriage B is a cylinder 11 provided at its lower end with a T shaped slot 12 adapted to receive and support one end of a T shaped bar 13 supported at other points by clips 14, and having a series of notches 15. After the bar 13, has been inserted into the slot 12, the cylinder 11 is drawn vertically by means of the bolt 16 threaded into the upper end thereof, thereby clamping the bar 13 against the underside of the carriage B, and preventing its displacement.

A locking detent or plunger 18 is slidably mounted in a bore 17 in the base and is normally held in its upward position by means of a spring 19 resting in a socket 20 formed in the base A. This plunger is provided on its upper end with a lug or tooth 21 adapted to enter any one of the notches 15 in the bar 13 to lock the carriage B in any one of its several positions. One side of the detent 18 is cut away as at 22 forming a shoulder 23. An extension 24 on a collar 25 engages shoulder 23 to depress the detent. The collar 25 is loosely mounted on a shaft 26 which is journaled in bearings formed in the base A, and provided on one end with an operating lever 27 provided with a pawl operating grip 28 the pawl being adapted to engage holes 28' in base A. This collar 25 carries an inverted L-shaped lever 29 having mounted on its outer end a roller 30 engaging a short spiral groove 31 formed in the offset upper end of a lever 32 whose hub portion 33 is slidably mounted on the shaft 26. This lever 32 also carries a ring yoke 34 encircling one member 35 of a tarry clutch splined to the shaft 38. The opposite member is formed integral with a large gear 37 loosely mounted on the shaft 38, and comprises two or more projections 36 on said gear.

Clutch member 35 has similar projections and the co-acting projections are so spaced as to provide lost motion between the driving and the driven element, thus permitting the carriage to tarry or dwell at the end of each reciprocation long enough for the work to make at least one revolution, to insure even grinding throughout its length, as in my co-pending application No. 424,905 dated Nov. 18, 1920.

A pinion 39 is formed integral with gear 37 and meshes with a rack-bar 40 secured beneath the carriage B. The lever 29 is oscillated by means of a spring 41 secured thereto and also secured to a collar 42 made fast to the shaft 26 so that, when the shaft 26 is turned by means of the lever 27, it imparts similar motion to the collar 42 which in turn energizes the spring 41 causing a partial rotation of the lever 29, which through the medium of the roller 30 and groove 31, causes the sleeve 33, yoke 34 and clutch member 35 to move towards but not so far as to engage the member 36. At the same time, the lug 24 presses downwards on the shoulder 23 of plunger 18 disengaging the tooth 21 from the respective notch 15 engaged thereby, thus allowing the carriage to be moved by hand. This is accomplished by means of a hand wheel 43 secured to the outer end of a shaft 44 journaled in the base A and having keyed thereto a gear 45 which meshes with the gear 37 and imparts motion thereto when the hand wheel 43 is turned. A stop 47 carries a pin 46 normally in the path of lever 27, the stop being pivoted as at 48.

In operation with the parts in the position shown on the drawings the wheel carriage will be stationary and the grinding wheel will act against a part of the revolving work such as for instance a pin on a crank shaft. When it is desired to move the carriage to a new position the lever 27 is swung to the right (Fig. 1) until it rests against pin 46. This movement releases detent 21 from the notch 15 previously engaged thereby and moves clutch member 35 but not far enough to engage the projections 36. With the parts in this position hand wheel 43 is turned and through gears 45, 47 and 39 moves rack 40 and with it the carriage B to the next grinding position. This brings another notch 15 opposite the detent 21 and the lever 27 being released locks the carriage in position to grind the next crank pin or the like.

If the operator desires the carriage to reciprocate he will swing the pawl 46 about its center 48 into vertical position. The pin 46 being now out of the path of lever 47 the lever can be moved far enough to the right to cause clutch members 35 and 36 to engage, whereupon the shaft 38, which derives reciprocating motion from its driving mechanism, will drive the carriage back and forth through clutch members 35, 36, gears 37, 39, and rack 40, the clutch members acting as above described to give a tarry or a dwell to the carriage at the end of each reciprocation.

I do not limit myself to the specific embodiment of the invention disclosed in the drawings and described in the specification as various modifications will occur to those skilled in the art. Neither do I limit myself to the use of the device in a grinding machine since certain features may be used in other machines. The true scope of the invention is shown in the appended claims.

Having thus fully described my said invention, what I claim as new and desire to secure by Letters Patent, is:

1. In a grinding machine, a base, a carriage thereon, means acting to move the carriage and spring exerted means acting alternately therewith to lock it in any one of a plurality of predetermined positions.

2. In a grinding machine, a base, a grinding wheel carriage adapted for reciprocation on the base, means to drive the carriage comprising a clutch, means to disconnect the clutch members and means co-operating with the disconnecting means for locking the carriage in predetermined position.

3. In a grinding machine, a base, a grinding wheel carriage adapted for reciprocation on the base, means to drive the carriage comprising a clutch, and means to disconnect the clutch members and at the same operation to lock the carriage in any one of a plurality of selected positions.

4. In a grinding machine, a base, a grinding wheel carriage adapted for reciprocation on the base, means for driving the carriage comprising a clutch, a rockshaft for operating the clutch, and means connected to the rockshaft for locking the carriage in selected position, substantially as set forth.

5. In a grinding machine, a base, a grinding wheel carriage adapted for reciprocation on the base, means for driving the carriage comprising a clutch, a detent yieldably actuated to engage the carriage, and common means to release the detent and disconnect the clutch in alternation, substantially as set forth.

6. In a grinding machine, a base, a grinding wheel carriage adapted for reciprocation on the base, means for driving the carriage comprising a clutch, a detent yieldably actuated to engage the carriage, a rock-shaft, yielding connections from the lever to the clutch for controlling the same and an arm on the rock shaft engaging the detent to withdraw it from the carriage, substantially as set forth.

7. In a grinding machine, a base, a carriage for a grinding wheel movable on the base, driving means for the carriage, means for locking the carriage in any one of a plurality of positions, a rock-arm connected to the clutch and the locking means and means normally limiting movement of the rock-arm in one direction, to prevent engagement of the clutch members, substantially as set forth.

8. A device of the class described comprising a base, a carriage adapted to be moved laterally on said base, a power driven shaft and a manually driven shaft adapted to operate said carriage when desired, a notched bar carried by and beneath said carriage, a spring-pressed locking bolt carried by said base, a rock-shaft journaled in said base, an operating handle secured to said rock-shaft, a lug on said rock-shaft adapted to engage said locking bolt, a clutch member slidably keyed to said power shaft and means carried by said rockshaft for sliding said clutch member into and out of engagement with its component member, substantially as described.

9. In combination, a base, a carriage adapted to reciprocate thereon and a spring exerted detent carried by the base and adapted to automatically engage notches on the carriage to secure said carriage in any one of a plurality of positions with respect to said base.

10. In combination, a base, a carriage movable thereon and means to secure said carriage in any one of a plurality of positions with respect to said base, comprising a bar secured beneath the carriage and operating means on the exterior of the base to engage the bar, substantially as set forth.

11. In combination, a base, a carriage slidable thereon, a bar on the under side of the carriage having spaced notches, a spring exerted detent adapted to engage any one of said notches, and means for clamping the bar upward against the carriage in any desired position thereon, substantially as set forth.

12. In combination, a base, a carriage slidable thereon, a bar beneath the carriage having spaced notches, said carriage having a vertical bore, a rod in the bore, said bar being slidable in an opening through the rod, and means to move the rod to clamp the bar to the carriage, substantially as set forth.

13. In a grinding machine, a traversing carriage, means for traversing the same comprising a clutch, a hand lever for disconnecting the clutch and independent means in the path of the lever normally preventing re-engagement of the clutch, substantially as set forth.

14. In a grinding machine, a carriage and means for traversing the carriage comprising a shaft, a clutch thereon, a hand lever for disconnecting the clutch and a pivoted device normally in the path of the lever to prevent re-engagement of the clutch, substantially as set forth.

15. In a grinding machine, a traversing carriage, means to lock the same in various predetermined positions, automatic means to traverse the carriage including a clutch, a lever adapted to jointly control the clutch and the locking means and means to limit movement of the lever whereby the locking means is disengaged without permitting engagement of the clutch, substantially as set forth.

16. In a grinding machine, a traversing carriage, means to lock the same in various positions, automatic means to traverse the carriage, means acting jointly to disable said locking means and said automatic means alternately, and a safety device normally preventing engagement of said automatic means but permitting disengagement of said locking means, substantially as set forth.

17. In a grinding machine, a carriage, means for traversing the carriage, means for disconnecting the driving means whereby the carriage may be traversed manually, said means including a clutch, means for locking the carriage in any one of a number of positions, a lever adapted to disengage the clutch and permit operation of the locking means when moved in one direction and to unlock the locking means and permit re-engagement of the clutch when moved in the other direction and means in the path of the lever normally limiting movement of the lever to prevent re-engagement of the clutch, substantially as set forth.

In witness whereof, I have hereunto set my hand and seal at Washington, District of Columbia, this thirteenth day of November, A. D. nineteen hundred and twenty.

PAUL STONER. [L. S.]

Witnesses:
E. W. BRADFORD,
F. W. DAHN.